April 30, 1935.  A. RONNING  1,999,527
AUTOMATIC HEADLIGHT DIMMER
Filed April 27, 1929
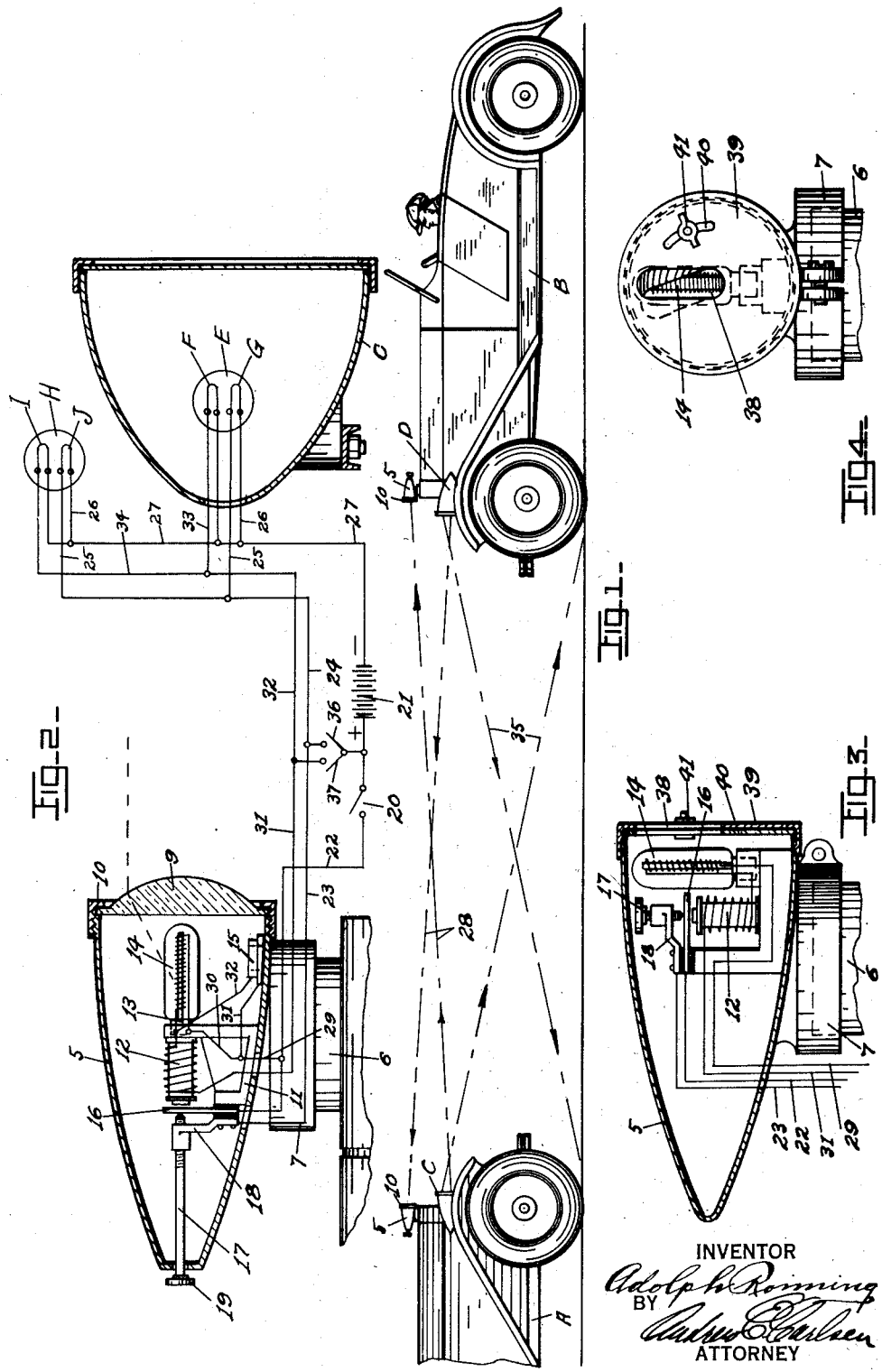

Patented Apr. 30, 1935

1,999,527

UNITED STATES PATENT OFFICE 1,999,527

AUTOMATIC HEADLIGHT DIMMER

Adolph Ronning, Minneapolis, Minn.

Application April 27, 1929, Serial No. 358,627

3 Claims. (Cl. 171—97)

This invention relates to headlight control apparatus, for vehicles, and the primary object is to provide light sensitive means for controlling head light circuits, whereby the headlights of a vehicle will function in their usual manner when it is dark and there is proper need for them, but which will operate to dim or deflect the light rays when the apparatus is subjected to light rays from other than the lights of the vehicle on which it is carried, as when approaching the headlights of other vehicle or street lights, at which time there is no necessity for maintaining the headlight rays in their nearly horizontal or most effective lighting conditions. A further object is to provide an apparatus of the character described, which, when carried by two approaching vehicles will automatically "dim" their lights so that the cars can pass each other on the road with a greater degree of safety. Further and more specific objects will be disclosed in the course of the following specification, reference being had to the accompanying drawing, in which:

Fig. 1 is a side elevation of two cars (one broken away in part), equipped with my invention, shown as approaching each other on a street or highway, and demonstrating by dotted lines the reaction of the respective headlights upon my apparatus.

Fig. 2 is an enlarged detail view showing my device and the headlight unit of a car in section and with the necessary circuit connections.

Fig. 3 is a detail sectional elevation showing a modification of the control unit shown at the left in Fig. 2.

Fig. 4 is a front elevation of the device as shown in Fig. 3.

Referring to the drawing more particularly and by reference characters, A and B designate approaching automobiles having headlights C and D, respectively. As shown in Fig. 2 the headlight is provided with a lamp E having pairs of filaments F and G, and a similar lamp H is provided for the opposite side of the same car with filaments I and J connected in the same circuits with filaments F and G so as to be controlled simultaneously therewith. For the purposes of illustration the light filaments G and J may be considered as the usual high power lights, while the filaments F and I can be considered as the filaments which throw the downwardly refracted or dimmer lights.

My automatic control mechanism is enclosed within a housing 5 that may be conveniently secured upon the radiator neck 6 of the car by a releasable clamping collar 7. As shown in Fig. 2 the front end of the housing 5 is closed by a lens 9, secured as by a ring 10. Within the housing is secured a bracket 11, one arm of which supports an electro-magnet 12 and a socket 13 to receive a light sensitive element 14 such as a selenium cell connected in circuit with the magnet 12, so that with the circuit wires energized a current will be caused to flow through the magnet wires when the element 14 is exposed to a sufficient degree of light. A second socket 15 is shown as connected in parallel with the socket 13, as it may be desirable to secure the tube 14 in a vertical instead of a horizontal position whereby a greater surface may be directly exposed to the light coming through the lens 9. One end of the magnet 12 is slightly spaced from a flexible contact bar 16 carried on and insulated from the bracket 11, and normally spring held in contact with an adjusting screw 17. This screw is threaded in a rigid arm 18 of the bracket 11, and extends out through the rear end of the housing 5 where it it is provided with an adjusting head 19. When the magnet 12 is energized it acts to pull the upper end of the bar 16 away from the screw 17 to break the circuit contact therebetween.

The circuit system and operation of the device may be described as follows:

To close the normal headlight circuit the operator closes a switch 20, the effect of which is to complete a circuit from a battery 21 through wire 22 bar 16, screw 17, arm 18, wires 23, 24, 25, main filaments G and J and by return wires 26 and 27 to the battery. The headlight now projects a beam that is effective or sharp to an elevation at least as high as that indicated by lines 28 in Fig. 1. Consequently as the cars approach, or as one of them comes into other light conditions strong enough to influence the light sensitive element 14, a circuit will be completed through switch 20, wires 22, 29, 30 (or 31, 32), element 14, magnet 12, wires 31, 32, 33 and 34, to the filaments F and I and thence back to the battery 21 through wire 27. Thus the dimmer circuit is closed, and by energizing the magnet 12 breaks the contact 16—17 to open the main light circuit. Under these circumstances the headlights of the car are dimmed, or the light is deflected downwardly, as indicated by lines 35, thereby preventing the objectionable glare to the opposing driver's eyes and to place the light beam where it is most effectively used when the cars are about to pass. When the cars have passed or a dark condition is again met with the circuit conditions will again be reversed to restore the normal or bright lights of the car. Under certain circumstances it may be found desirable to permanently energize either the bright filaments or the dimmer filaments and this may be effected by closing shunt circuit switches 36 and 37, respectively. To regulate the device so that it will respond to various predetermined light conditions it is only necessary to adjust the regulator screw 17, so that the strength of current required to break the contact 16—17 may be varied at will.

In the modification shown in Figs. 3 and 4 the various parts shown are arranged slightly different but function in an identical manner to that above described. In this case, however, the tube 14 is shown as in a vertical position in front of a slot 38 in a casing cap 39, and the size of this slot opening is regulated or adjusted by a shutter plate 40, adjustably secured by a thumb screw 41. This shutter may be made of glass that is opaque except for a transparent portion adapted to register with the slot 38, so that dust and dirt will be excluded from the casing.

It may here be mentioned that while this device is primarily intended for automatically deflecting or dimming the light rays of a vehicle when the vehicle is meeting another car or is entering an area lighted by other lights, it is also useful to deflect the light beams downwardly upon the road when the car is travelling in a dense fog, at which time the main light beams give little assistance to the driver, under which conditions the fog will reflect enough light, if the device is properly adjusted, to cause the necessary reaction upon the element 14.

It is further understood that the use of this device is not necessarily limited to automobiles and trucks, but may be employed to advantage in aircraft, motor boats, or any other type of vehicle.

It is also understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination including a normally closed bright and a normally open dimmer circuit, means in the dimmer circuit having the property of increasing its conductivity by the action of light thereon for automatically closing the same when exposed to light, and operative to simultaneously open the bright circuit, and means for adjusting the automatic closing means whereby the latter may be caused to operate at any predetermined degree of light strength.

2. Means for controlling the brilliancy of electric headlights comprising a source of electric energy, two sets of electric headlights of different candle-power, a light sensitive medium included in circuit with the lights of lesser candle power and having the property of increasing its conductivity of the electric current by the action of light thereon, and a relay having an operating coil in circuit with said light sensitive medium and one set of headlights and its contacts in circuit with the other set of headlights, for changing the circuit from one set of headlights to the other on operation of the relay.

3. The combination with a vehicle light having bright and dimmer circuits, said bright circuit being normally closed, of light sensitive means in the dimmer circuit and having the property of increasing its conductivity of electric current by the action of light thereon for automatically opening the bright circuit when said means is subjected to light of a predetermined strength, and adjustable means for regulating the sensitiveness of the light sensitive means required to produce said circuit opening and closing operations.

ADOLPH RONNING.